United States Patent [19]

Palmer

[11] Patent Number: 4,602,359
[45] Date of Patent: Jul. 22, 1986

[54] METHOD FOR DETERMINING VARIATIONS FROM FLATNESS IN THE TOPOGRAPHY OF A DISC SURFACE

[75] Inventor: Richard C. Palmer, Blawenburg, N.J.

[73] Assignee: RCA Corporation, Princeton, N.J.

[21] Appl. No.: 518,733

[22] Filed: Jul. 29, 1983

[51] Int. Cl.$^4$ ............................................. G11B 27/36
[52] U.S. Cl. ...................................... 369/58; 369/53
[58] Field of Search .................. 369/58, 53, 126, 43; 358/342

[56] References Cited

U.S. PATENT DOCUMENTS

| | | | |
|---|---|---|---|
| 3,830,505 | 8/1974 | Rabinow | 369/43 |
| 3,842,194 | 10/1976 | Clemens | 369/126 |
| 3,872,241 | 3/1975 | Adler | 369/43 |
| 4,044,379 | 8/1977 | Halter | 369/144 |
| 4,325,134 | 4/1982 | Langley | 369/53 |
| 4,410,970 | 10/1983 | Law | 369/58 |
| 4,481,616 | 11/1984 | Matey | 369/58 |
| 4,541,716 | 9/1985 | Crooks | 356/237 |

*Primary Examiner*—Alan Faber
*Attorney, Agent, or Firm*—Birgit E. Morris; Donald S. Cohen; Joseph D. Lazar

[57] ABSTRACT

A method is provided for determining the magnitude of flatness deviation in high density information discs, such as video discs, manifesting irregularities in playback. Such flatness deviations are known as "orange-peel." A stylus riding over a relatively large area (4–5 grooves) of the disc surface provides a vertical velocity signal within a given spatial or temporal frequency band. The signal in velocity or displacement form is the quantitative measure of deviation. The method is useful for other type discs where quantitative measurements in flatness deviation are desired.

11 Claims, 6 Drawing Figures

METHOD FOR DETERMINING VARIATIONS FROM FLATNESS IN THE TOPOGRAPHY OF A DISC SURFACE

This invention relates to a method for measuring disc surface irregularities.

BACKGROUND OF THE INVENTION

A high density record such as a video disc of the type described in U.S. Pat. No. 3,842,194 issued to J. K. Clemens is used in the playback system of the variable capacitance type. In one configuration of the Clemens' system, information representative of recorded picture and sound is encoded in the form of a relief pattern in a relatively fine spiral groove on the surface of a disc record. For example, groove widths of approximately 2.6 micrometers and groove depths of about 0.5 micrometer may be used. During playback, capacitive variations between a conductive electrode on a stylus and a conductive property of the disc record are sensed to recover the prerecorded information.

In accordance with the Clemens' format, the video information may be recorded as relatively short (e.g., 0.6–1.6 micrometers) relief variations along the length of the spiral groove. Illustratively, the method of recording may be of a type shown in U.S. Pat. No. 4,044,379 to J. B. Halter. Pursuant to the Halter method, an electromechanically-driven stylus (e.g., of diamond) having a triangular shape, responsive to a combined video and audio signal, records relatively short geometric variations, representative of the time variations of the signal, on a surface of a metal substrate. After the electromechanical recording operation, the recorded surface of the metal substrate has a relief pattern corresponding to that which is desired in the final record. In the replicating process, masters are made from the substrate. Molds are then made from the masters and stampers are made from the molds. The stampers are used in the process of pressing a vinyl record having the desired relief pattern.

During each of the above-identified record manufacturing processes, various kinds of defects can develop which may affect the record groove quality and which are difficult to detect in view of the fineness of the groove structure typically employed in a video disc (e.g., 10,000 groove convolutions per inch [4000 convolutions per cm]).

Because of the very small dimensions of the signals recorded on the video disc, very small defects can disturb the playback of a disc. Many defects which cause trouble in playback are difficult to see when viewed under normal lighting or when observed through a microscope.

Irregularities in the surface of a video disc contribute to various deficiencies in performance, such as stylus and disc wear, excessive noise in the audio channel derived by the playback apparatus, and excessive streaking in the color channels, more usually identified as the chroma channel. Some of these irregularities appear on the surface of the video disc in a form which has become known as "orange-peel." Techniques developed by H. N. Crooks, et al. for determining the orange-peel in video discs by optical means are disclosed in copending U.S. application Ser. No. 485,474, filed Apr. 15, 1983, now U.S. Pat. No. 4,541,716, issued Sept. 17, 1985, which patent is incorporated by reference herewith. See also copending application Ser. No. 307,021, now U.S. Pat. No. 4,481,616, filed Sept. 30, 1981 by J. E. Matey, now U.S. Pat. No. 4,481,616, issued Nov. 6, 1984, for a description of a method for determining topography variations in a video disc.

There is a need in the manufacture process of video discs to measure and quantify surface irregularities in order to identify deficient manufacturing operations and to provide quality control of video disc production.

SUMMARY OF THE INVENTION

Quantified measurements in variations from flatness in the topography in the surface, for example, of a high density information disc such as a video disc are made by rotating the disc at a constant predetermined rotational velocity ($\omega$) about an axis perpendicular to the surface of the disc, scanning the surface of the disc with audio-frequency pick-up means adapted to develop electrical signals representing vertical deviations in the flatness of the surface of the disc manifested as vertical velocity movements of the pick-up stylus, and, preferably, integrating the vertical signals to convert the velocity signals variations into displacement signal variations. The magnitude of the displacement signals is indicative of the degree of irregularity or deviation from flatness in the surface of the disc.

DETAILED DESCRIPTION OF THE PREFERRED EMBODIMENT

The invention is concerned with measuring and quantifying the irregularities, i.e., variations from flatness, appearing on the surface of a high density information disc, such as a video disc. These irregularities, which appear as a surface irregularity known as "orange-peel," cause, for example, excessive noise in the audio channels of the T.V. signals and excessive streaking in the chroma channel. Moreover, the irregularities in the surface cause deficiencies in performance such as stylus and disc wear. The invention is based on the discovery that these irregularities, which are, more precisely, deviations from flatness, can be measured and quantified by determining the vertical velocity or displacement as sensed by a cartridge with a stylus extending over a large area, for example, at least four adjacent grooves of a disc, while there is relative motion between the disc and the stylus. The signal sensed by the stylus corresponds to vertical velocity movements of the stylus and represents thereby the deviation from the flatness of the disc. The deviation from flatness of the disc, it should be understood, does not relate to the intentional information deviations that are provided in the disc surface, but rather to the flatness deviations from a reference flat plane over an extended area of the disc. It is this deviation in the extended area appearing as orange-peel that manifests itself as deficiencies in performance. The rotational velocity of the disc under test is selected to a predetermined value such that the cartridge will detect deviations in surface flatness having a predetermined spatial frequency ($\nu$). The details of how this method is carried out will now be described.

Figure 1:
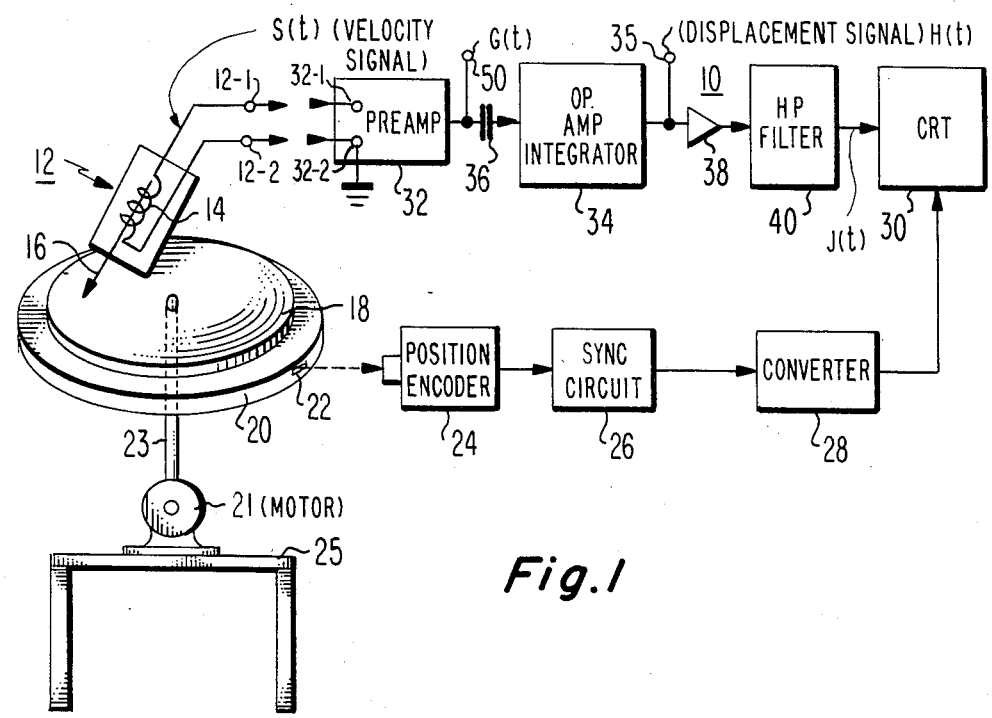
FIG. 1 is a system schematic of test apparatus useful in practicing one mode of the invention for quantifying roughness by displaying the roughness profile of the surface of a disc as a function of angular position.

Reference is made to FIG. 1 for a system useful for carrying out the method of the invention. The test apparatus 10 comprises a magnetic cartridge 12 arranged to respond to vertical excursions of the stylus riding over a disc 18. The cartridge 12 includes generally a stylus 16 and a magnetic coil 14, shown in detail in FIGS. 3A and 3B to be described. The disc 18 is mounted on a turntable 20 rotated about a shaft 23 driven by a motor 21. The turntable is mounted on a firm support table 25 in order to isolate the system from external vibrations. A position light 22 on the turntable 20 is used to excite a position encoder 24 providing a signal to a synchronizing circuit 26 and a converter 28 for application of synchronizing signals to a cathode ray oscilloscope (CRT) 30. Signals from the cartridge 12 are applied via terminals 12-1 and 12-2 to terminals 32-1 and 32-2 of a preamplifier 32 having a gain of about $24 \times 10^3$ and having flat response characteristics from 10 Hz to 20 kHz. Signals from the preamplifier are coupled to a terminal 50 for providing a signal representing the vertical velocity of the stylus 16 riding on the disc 18. The signal from the preamplifier 32 is also coupled through a capacitor 36 to an integrator formed suitably of an operational amplifier 34, which, in turn, provides the integrated signal to an amplifier 38 and then to a high-pass (HP) filter 40 providing a signal therefrom to a CRT 30. The filter 40 has a cutoff frequency of 44 Hz, for example, to isolate noise from the motor 21 from the system. The filter 40 is typically a Krohn-Hite Filter, Model 3202. The display on the CRT 30 will be a representation of the roughness profile of the disc 18, such as the ideal profile shown in FIG. 4, to be described.

Figure 2:
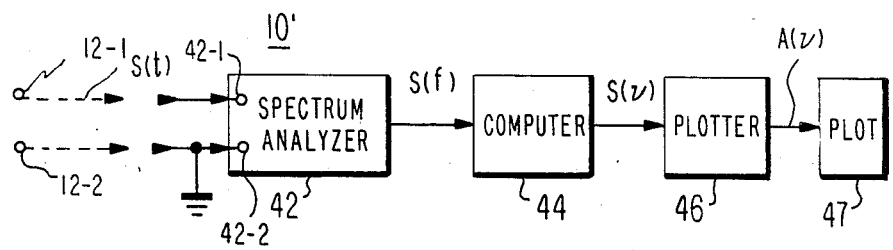
FIG. 2 is a system similar to FIG. 1 for practicing the preferred mode of the invention quantifying roughness as a function, of spatial frequency.

Simultaneously or, in the alternative, the signal from the cartridge 12 is applied via terminals 12-1 and 12-2 to terminals 42-1 and 42-2 of a spectrum analyzer 42 as seen in FIG. 2. A Hewlett-Packard (HP) 3585A analyzer is used for high noise frequency analysis and a HP3582A is used for low noise frequency analysis. The output of the spectrum analyzer 42 is coupled to a a computer 44, typically a Hewlett-Packard computer model 9825A, which, in turn, processes the signals from its input to provide data to a plotter 46, typically a Hewlett-Packard Plotter 7245, for generating a plot 47 of a noise spectrum as a function of spatial frequency ($\nu$) of the disc 18. The plot 47 will be of the form shown in FIG. 5 to be described. It is this noise spectrum that provides one quantitative measurement of the flatness deviation in the disc 18.

The stylus 16 used to sense the vertical excursions or deviations over the disc is suitably provided in a conventional audio stereo pickup cartridge. The size of the tip of such a stylus is about 0.7 mil in diameter (0.0007 inch), while the size of the typical groove of a video disc is much smaller, viz., about 0.0001 inch. The stylus 16 of the typical audio stereo pickup is preferably abraded to provide several tips, preferably, four tips, so as to engage simultaneously four grooves, each groove with a dimension of about 0.0001 inch. Accordingly, such a stylus in contact with a disc of such grooves will ride simultaneously over about four adjacent grooves and be easily supported because of the distribution of the weight of the cartridge and will track the convolutions on the disc 18.

In the preferred mode of practicing the invention, the stylus of an audio stereo pickup cartridge is lapped to conform to the shape of the grooves. The lapping procedure uses a $\frac{1}{4}$ micron diamond paste thinned with lapping oil dotted around the video disc used for lapping in about 8 areas of about $\frac{1}{2}$ inch (12 mm) in diameter at a radius of about 5 inches (12 cm). The stylus is then run over the lapping disc at about a 5-inch radius for about 2 to 3 hours at 45 rpm with a tracking force of about 0.5 gram. This lapping procedure develops several points across the width of the stylus fitting a corresponding number of adjacent grooves of the video disc. The bearing area of the lapped surface of the stylus is sufficient to support a tracking force up to a gram or so without damage to the disc being tested.

Figure 3A:
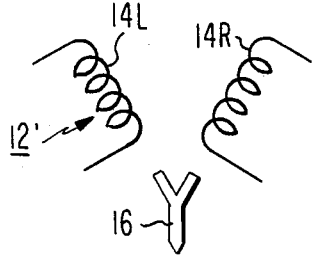
FIG. 3A is a schematic of components of a magnetic audio stereo pickup cartridge useful in the practice of the invention.
Figure 3B:
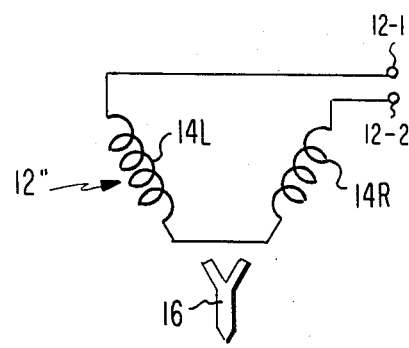
FIG. 3B is a wiring diagram of the cartridge shown in FIG. 3A as used in the practice of the invention.

The magnetic coils of the conventional stereo pickup are modified in accordance with the present invention to provide a signal corresponding only to vertical excursions of the stylus 16. As seen in FIG. 3A a conventional magnetic stereo cartridge 12' includes a left coil 14L and a right coil 14R in cooperative positional relation to the stylus 16. In conventional operation, the movement of the stylus 16 within the coils 14L and 14R provides independent signals corresponding to the stereo signals provided in the conventional stereo audio disc. Such a cartridge is modified for the present invention as shown in FIG. 3B as cartridge 12''. The left coil 14L and the right coil 14R are wired in series opposition to respond essentially and exclusively to vertical motion of the stylus 16. The signal representing such vertical motion is applied to terminals 12-1 and 12-2 which are connected to the input terminals 32-1 and 32-2 of the preamplifier 32 (FIG. 1). Terminal 32-2 conveniently can be grounded to the system ground.

With the apparatus 10' of FIG. 2, a direct determination of the spectrum of the deviations in flatness, for example, orange-peel, was made as represented by the plot 47 using the modified audio pickup cartridge 12'' and the turntable 20. With the apparatus 10 of FIG. 1, a roughness profile in the direction of the grooves of the region of the disc under test was portrayed on the CRT 30.

The magnetic pickup cartridge 12'' responds to velocity excursions by the stylus tip 16. When connected to respond to the vertical stylus velocity (FIG. 3B), the response is essentially uniform to about 10 KHz with a sensitivity of $1.77 \times 10^{-4}$ volts per millimeter per second and usable sensitivity to about 25 KHz.

Figure 4:
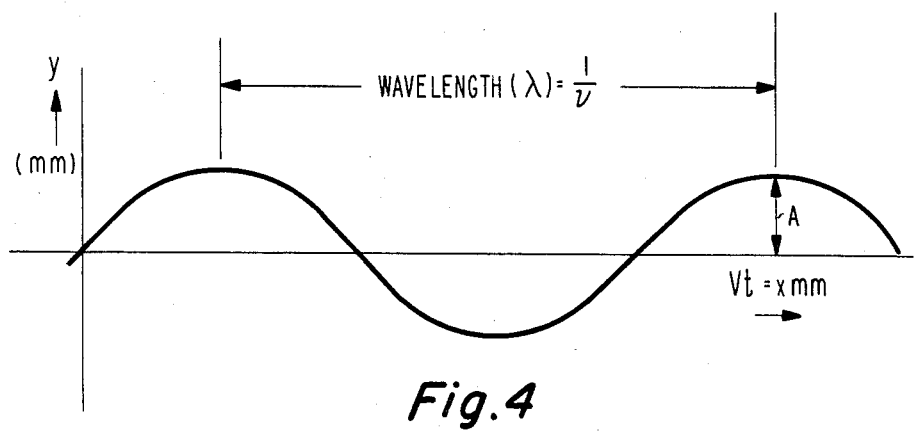
FIG. 4 is a representation of a profile of the disc used to describe the principles of the invention.

The determination of the amplitude (A) of the deviation in flatness will now be explained. Reference is made to FIG. 4 illustrating an ideal sinusoidal roughness profile of peak amplitude A in the direction x of relative stylus movement over a disc. The waveform of FIG. 4 can be represented by the equation:

$$y = A \sin 2\pi\nu x \tag{1}$$

where y is the ordinate in millimeters, $\nu$ is the spatial frequency in cycles per millimeter, x is the abscissa increasing in the spatial dimension in millimeters and A is the peak amplitude.

Equation (1) is differentiated to give:

$$\frac{dy}{dx} = 2\pi\nu A \cos 2\pi\nu x = \frac{dy/dt}{dx/dt} \quad (2)$$

Solving for the time derivative of the ordinate provides:

$$\frac{dy}{dt} = 2\pi\nu A \cos 2\pi\nu x \frac{dx}{dt} \quad (3)$$

The velocity V and the displacement x are represented by equations (4a) and (4b) where V is the linear velocity of the stylus in or on the groove:

$$dx/dt = V; \quad (4a)$$

$$x = Vt \quad (4b)$$

Substituting equation (4a) and (4b) into (3) provides $$dy/dt = 2\pi\nu VA \cos 2\pi\nu Vt \quad (5)$$

Moreover, it is known that:

$$\nu V = f \frac{\text{cycles}}{\text{sec}} \quad (6)$$

Substituting equation (6) in equation (5) provides $$dy/dt = 2\pi fA \cos 2\pi ft \quad (7)$$

Since the stylus follows the surface profile, its vertical velocity will be dy/dt; the resulting signal output S(t) will be the product of its vertical velocity in millimeters per second and its sensitivity, R, in volts per millimeter per second represented as follows:

$$S(t) = dy/dt = R \, 2\pi fA \cos 2\pi ft \quad (8)$$

From Equation (8) it is seen that the signal output, S(t), from the cartridge is a function of the profile amplitude, A, and frequency, f. Equation (6) provides a conversion between temporal frequency, f, and spatial frequency, $\nu$.

If a component of "orange-peel" roughness at spatial frequency $\nu$ has an amplitude (A), the vertical departure (y) from flatness is defined in equation (1) described hereinabove, where x is the distance along the path of the travel of the stylus 16.

Figure 5:
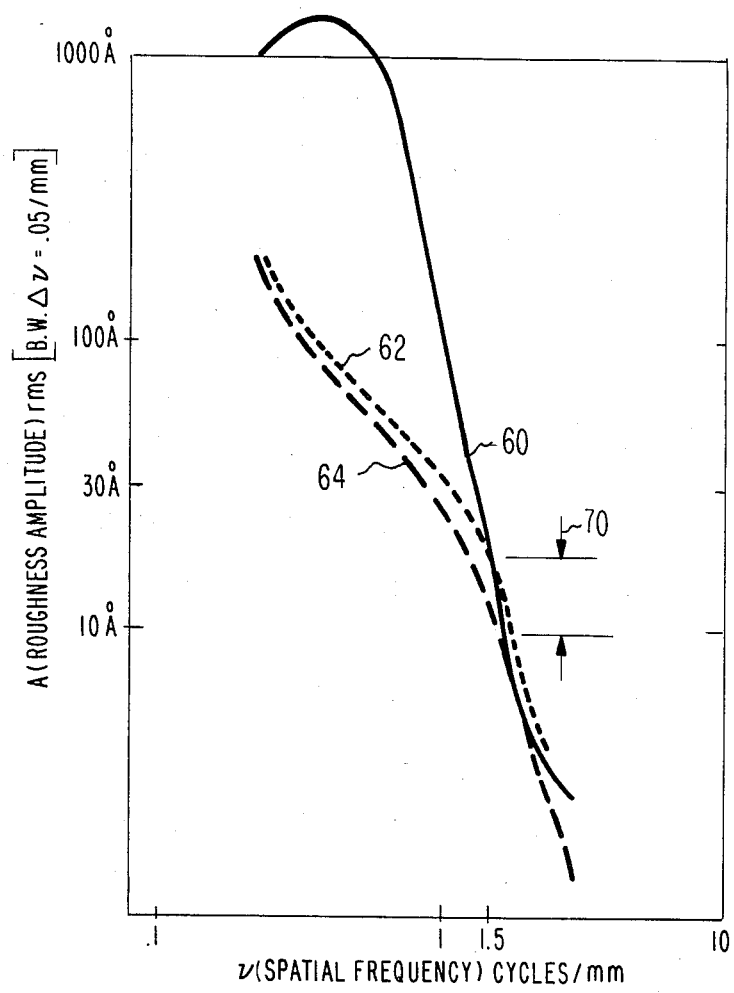
FIG. 5 is a plot of noise spectrum, or amplitude versus the spatial frequency, of discs tested for flatness deviation.

Orange-peel is an isotropic roughness and has no clearly defined value of spatial frequency $\nu$, but rather extends over a broad range of spatial frequencies as shown by FIG. 5, to be described. Measurement and quantification of such a noise distribution is best carried out using methods for measuring noise. Indeed, orange-peel is noise in the flatness of the surface. Noise is typically quantified as the rms value of all the noise components taken together over usually a small interval of frequency, either in terms of temporal frequency, f, or, spatial frequency, $\nu$. The variation of the rms value with frequency is the noise spectrum desired.

Spectrum analyzer 42 (suitably Model HP-3585A) is arranged to yield an rms value for signal S(t) [Equation 8] measured over a frequency interval $\Delta f$ centered at a frequency f. Equation (8) taken together with Equation (6) allows for the determination of the amplitude A in this same sense, i.e., an rms value of amplitude A measured over a spatial frequency interval $\Delta\nu$ centered at spatial frequency $\nu$.

In the case of a localized periodic roughness profile, such as "cross-over" roughness, the spatial frequency $\nu$ is a clearly defined frequency. Equation (8) then defines a cosine waveform at the region of the record or disc under study and, from the display on CRT 30, the amplitude (peak-to-peak, say) of signal S(t) derived from the cross-over roughness can be measured and the roughness amplitude A determined from equation (8) in the same sense (peak-to-peak). Cross-over roughness is due to the impressions caused over the cooling channels in the video disc record press molds effecting local warping effects during the pressing of the record.

If it is desired that the amplitude A is to be interpreted as an rms orange-peel amplitude in the spatial frequency interval $\Delta\nu$, then the signal amplitude S(t) must be determined as an rms value measured at the frequency $f = \nu V$ [equation (6), supra] with the bandwidth of $\Delta f$. As can be seen from the relationship [equation (6)] between the temporal and spatial frequencies, a range of spatial frequencies of interest can be translated to a suitable temporal frequency range by selection of the groove velocity (V), subject to two limitations. First, there must be the ability of the pickup cartridge 12'' to track the record 18 and, second, the spatial wavelengths ($\nu$) must be longer than several times the stylus tip dimension or the profile will not be accurately followed by the stylus. For the stylus tip dimension of 0.0007 inch described above, spatial frequencies less than 25 cycles/mm can be accurately followed. In order to meet these stringent requirements, according to the invention, a relatively low speed of rotation of the motor 21 to drive the disc 18 is used. For the test of a video disc, this speed is 45 rpm, which is 1/10 the playback speed of a video disc in a conventional video disc player. Frequencies are thus translated to 1/10 the values encountered at video disc rates and are easily detected above cartridge noise.

In tests performed at 45 rpm with the apparatus 10' (FIG. 2) described above, a bandwidth of 30 Hz has been used corresponding to $\Delta\nu = 0.05$/mm at about a 5-inch radius of the disc 18. This playback noise bandwidth interval, namely, 300 Hz at 450 rpm, approximates the width of the sharpest resonances seen in certain noise conditions manifested in video disc systems due to orange-peel effects. One such disturbance is known as "audio whistle" which occurs at about 10 Kz.

In practicing the method of the invention to provide a quantitative value of the deviation in flatness, namely orange-peel, it is essential that the apparatus be calibrated to a known and accurate reference signal. This is done utilizing a standard audio stereophonic test record such as a CBS-STR-100 made by CBS Laboratories which provides signals at various selected frequency bands of known amplitude. A standard record turntable is used such as that illustrated in FIG. 1 operating at, for example, 33⅓ rpm, corresponding to the playback speed of standard audio records. The cartridge 12'' is used wherein the stylus 16 rides in one groove of the audio disc. Measured output from the cartridge in response to the known stylus velocity imparted by the calibration record yields the sensitivity, R, of the cartridge.

A conventional video disc playback stylus riding in a groove of a video disc that has orange-peel will cause undesirable audio oscillations in the video disc playback system in the range of 200 Hz to 13 KHz. Accordingly, it appears that in the practice of the invention this frequency range defines the frequency range of interest in making the quantitative test of flatness deviations.

Orange-peel variations of about 14 dB have been observed in many discs.

Since the signal output S(t) from the cartridge is a time function corresponding to vertical velocity as shown by Equation (8), an integrator (e.g. OP. Amp 34, FIG. 1) can be used to yield a signal H(t) corresponding to vertical displacement, or record profile, at the output 35 of integrator 34 of FIG. 1.

In operation with the apparatus shown in FIG. 1 the cartridge 12" is placed in operative relation with the video disc 18 to be tested for surface roughness. The signal S(t) derived from the vertical movements of the stylus 16 is applied to the preamplifier 32 to generate an amplitude signal G(t) and thence to the integrator 34, to provide signal H(t) then amplified by the amplifier 38, then to the high pass filter 40 which functions to isolate the noise from the turntable and the like, and finally as signal J(t) to the CRT 30. The CRT synchronizing signals are generated from the position light 22 sensed by the encoder 24 which energizes the sync circuit 26 and thence the converter 28 to control the display on the CRT 30. A roughness signal J(t) will be displayed on the CRT 30. This display can be calibrated to represent the deviations in flatness at any particular portion of the disc. This embodiment of the invention is particularly useful in looking at isolated areas of the disc having localized departures from flatness. As understood in the art, such signals of small duty cycle tend to be under-represented in a spectrum of otherwise continuous noise as portrayed by conventional spectrum analyzers.

In the apparatus of FIG. 2, the method provides a display or plot 47 by means of a plotter 46 responding to the calculations made by computer 44 from the signals developed by spectrum analyzer 42. The display or plot 47 is the type seen in FIG. 5 to be described. Thus, FIG. 2 is used for determining statistical roughness for deviations caused by orange-peel which is isotropic or uniform roughness. Other forms of roughness defects may not be isotropic but may be localized with a relatively small duty cycle, such as caused by cross-overs in the mold used in pressing the disc, as described hereinabove in connection with FIG. 1.

In order to provide minimum noise and an accurately calibrated system, the discs are tested after the calibration of the sensitivity of the system with the same cartridge 12" and the same turntable 20. The video disc 18 to be tested is placed in position using a suitable shaft spacer to allow it to mount on the audio turntable shaft 23. It should be understood that the center hole of a video disc is about 1 inch, whereas the center hole of an audio disc is about ¼ inch. Thus a spacer of about ⅜ inch in width is needed to adapt the video disc to the audio turntable shaft 23.

Three video discs 18 were tested to cover the spatial frequency $\nu$ from about 0.2 to 3 cycles per millimeter. The noise amplitude A, in angstroms, indicative of orange-peel in rms values where $\Delta\nu$ is equal to 0.05 per millimeter, is plotted in FIG. 5. The value of $\Delta\nu$, as explained above, was selected to correspond to the width of the resonance causing audio whistle in order to assess the contribution of orange peel on a record to the excitation of this resonance. The apparatus of FIG. 2 was used with an HP 3585A spectrum analyzer to develop a noise spectrum as a function of frequency. The orange peel amplitude spectrum as a function of spatial frequency is computed by computer 44 using Equations (8) and (6), in response to the output signal S(f) of analyzer 42. The record disc 18 after calibration of the system was driven at 45 rpm and the analyzer 42 was operated to provide measurements at selected frequencies over the range 100 to 2000 Hz using a 30 Hz bandwidth. Since the tests were done at 45 rpm at a radius of about 5.5 inches, the record velocity was about 26 inches per second, or 660 millimeters per second. From Equation (6), at this velocity, the temporal bandwidth of 30 Hz corresponds to a spatial bandwidth $\Delta\nu$ of 0.05 cycles per millimeter. The frequency range 100 to 2000 Hz similarly corresponds to a spatial frequency range from 0.15 to 3 cycles per millimeter.

The signal S(f) from the analyzer 42 is applied to the computer 44 which converts the signal S(f) into the spatial frequency form as $S(\nu)$. Plotter 46 provides a plot 47 [$A(\nu)$] of the spectrum of the rms roughness A as a function of the spatial frequency $\nu$.

A plurality of test runs were made with apparatus 10' (FIG. 2) on three separate discs providing curve plots 60, 62 and 64, respectively, shown in FIG. 5. In generating the curve plots 60, 62 and 64 for the test discs, the apparatus was operated for a period of time that scanned about 4 adjacent turns of the groove at a radius of about 5.5 inches. While the roughness can be quantitatively represented in terms of the frequency it is helpful in tracing possible origins of the roughness and for comparing roughness at different (more typically radial) locations to represent the roughness in terms of spatial frequency, $\nu$, on the disc. It is for this reason that the plot of FIG. 5 is illustrated in spatial frequency ($\nu$) form although spatial wavelength ($\lambda$) form could be used, noting that $\lambda=1/\nu$.

It is seen from FIG. 5 that the curve plots 60, 62 and 64 show a noise spectrum that increases toward the lower spatial frequencies. Various spatial frequencies cause differing effects on operation of the video disc system. For example, those around 1.5 cycles/mm in the range 70 within the arrows corresponding to a frequency of 10 kHz at normal playback speed of 450 rpm induce audio whistle, while those around 0.5 cycle/mm contribute to chroma streaking. In general the orange-peel is isotropic roughness, and occurs in the spectrum within the range of 0.15 to 3.0 cycles per millimeters. Accordingly, the data of FIG. 5 can be used as a criterion for identifying significant values of orange-peel roughness which would be unsatisfactory in play in a video disc playback system. Values of roughness such as indicated by curves 62 and 64 of FIG. 5 have been found to be acceptable notwithstanding the visual appearance of orange-peel as seen, for example, by the Crooks' technique described in the above-identified patent application.

Limits on standards of acceptable roughness can be developed for other types of noise roughness in view of the description given hereinabove as desired. For example, one can provide a calibration curve for cross-over noise roughness explained above. Such isolated or non-isotropic roughness affects time base stability of the television picture during play and can be measured using the method described for FIG. 1. Such irregularities occur in the range of 0.03 to 0.06 cycle per millimeter.

The invention thus allows one to determine quantitatively deviation in flatness in a disc. FIG. 1 is used to determine displacement as a function of position or time as displaced by CRT 30. FIG. 4 is illustrative of an idealized roughness profile waveform as would be seen on CRT 30. If the roughness A were absent, the waveform would be flat.

FIG. 2 is used to provide a spectrum of rms roughness as a function of spatial frequency as plot 47. A typical plot for three specimen records each having orange-peel is shown in FIG. 5. While curves 62 and 64 depict records of satisfactory performance, the orange-peel depicted by curve 60 caused objectionable chroma streaking on playback.

While the invention has been described for determining the flatness deviation manifested as orange-peel in the video disc, the invention can be practiced using other types of discs where quantitative measurements in flatness deviation are desired.

What is claimed is:

1. A method for determining quantitatively variations from flatness in the topography of the surface of a video disc of the type used in high density information storage and retrieval systems, said disc having a spiral groove containing said information signals, comprising the steps of:
   (a) rotating said disc at a constant prdetermined rotational velocity ($\omega$) about an axis substantially perpendicular to the surface of the disc; and
   (b) scanning the surface of said disc with an audio frequency pick-up cartridge having a stylus adapted to ride simultaneously over at least four adjacent turns of said groove of said disc to provide an electrical signal representing quantitatively vertical deviations in flatness of the surface from an average flatness level.

2. The method of claim 1 further including the steps of:
   (a) integrating said signal to convert said signal into a signal representing the displacement of the stylus from a reference flatness level.

3. The method of claim 1 comprising rotating said disc at a rotation velocity such that the cartridge will detect deviations in surface flatness having a predetermined spatial frequency ($\nu$).

4. The method of claim 1 comprising scanning the disc surface with a magnetic cartridge having a stylus riding on said groove to provide said signal as a function of magnetic variations sensing only vertical movements of said stylus.

5. The method of claim 4 comprising the step of determining the sensitivity of said cartridge with an audio record having signal information tracks of a given frequency and amplitude.

6. The method of claim 1 wherein said flatness deviation is isotropic noise in the spectrum of about 0.15 to 3.0 cycles per millimeter.

7. The method according to claim 1 wherein said flatness deviation is in the range of 0.03 to 0.06 cycles per millimeter indicative of cross-over distortion.

8. The method according to claim 1 further comprising the step of providing a calibration signal at a particular frequency and magnitude to calibrate the sensitivity of said cartridge.

9. The method according to claim 1 further comprising the step of lapping said stylus tip to conform to approximately four adjacent turns of the groove.

10. The method according to claim 1 wherein the spatial wavelength ($1/\nu$) of the roughness on the surface of said disc is several times larger than the dimension of the stylus.

11. The method according to claim 1 further comprising the step of selecting the dimension of the stylus tip to be 0.018 mm such that spatial frequencies ($\nu$) less than 25 cycles per millimeter can be determined.

* * * * *